(12) United States Patent
Lee

(10) Patent No.: US 6,623,346 B2
(45) Date of Patent: Sep. 23, 2003

(54) AUTOMATED TRANSFER OF LIVE OBJECTS TO SHACKLE LINE METHOD AND APPARATUS

(75) Inventor: Kok-Meng Lee, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/748,656

(22) Filed: Dec. 22, 2000

(65) Prior Publication Data

US 2002/0062793 A1 May 30, 2002

Related U.S. Application Data

(60) Provisional application No. 60/252,987, filed on Nov. 23, 2000, provisional application No. 60/197,362, filed on Apr. 15, 2000, provisional application No. 60/177,576, filed on Jan. 22, 2000, and provisional application No. 60/171,990, filed on Dec. 23, 1999.

(51) Int. Cl.[7] ................................................ A22B 1/00
(52) U.S. Cl. ...................................... 452/53; 452/179
(58) Field of Search ................................ 452/179, 188, 452/163, 187, 166, 167, 53, 52, 54, 177, 180, 183, 184, 194

(56) References Cited

U.S. PATENT DOCUMENTS

| | | | | |
|---|---|---|---|---|
| 2,952,032 A | * | 9/1960 | Breitkreutz | 452/53 |
| 3,622,000 A | * | 11/1971 | McClenny | |
| 3,774,264 A | * | 11/1973 | Anderson et al. | 452/134 |
| 4,307,683 A | * | 12/1981 | Parker, Jr. | 119/716 |
| 4,658,476 A | | 4/1987 | van den Brink | 452/53 |
| 5,088,959 A | | 2/1992 | Heemskerk | 452/183 |
| 5,108,345 A | * | 4/1992 | Harben, III et al. | 452/183 |
| 5,129,857 A | * | 7/1992 | Keiter et al. | 452/179 |
| 5,134,971 A | * | 8/1992 | Krienke et al. | 119/713 |
| 5,259,811 A | * | 11/1993 | Berry | 452/183 |
| 5,340,355 A | * | 8/1994 | Meyn | 452/179 |
| 5,370,574 A | | 12/1994 | Meyn | 452/179 |
| 5,484,380 A | * | 1/1996 | Bevins | 493/480 |
| 5,514,033 A | * | 5/1996 | Berry | 452/182 |
| 5,672,100 A | * | 9/1997 | Nielson et al. | 452/188 |
| 5,897,201 A | * | 4/1999 | Simon | 362/268 |
| 5,944,598 A | * | 8/1999 | Tong et al. | 452/158 |
| 5,975,029 A | * | 11/1999 | Morimoto et al. | 119/843 |
| 6,254,471 B1 | * | 7/2001 | Meyn | 452/177 |
| 6,254,472 B1 | * | 7/2001 | Meyn | 452/188 |

FOREIGN PATENT DOCUMENTS

| | | | | |
|---|---|---|---|---|
| EP | 559271 | * | 9/1993 | |
| NL | 1003230 | | 5/1996 | A22C/21/00 |
| SU | 1576089 A2 | | 4/1988 | |
| WO | WO 94/19957 | | 2/1994 | A22B/1/00 |
| WO | WO-9745003 A1 | * | 1/1999 | 452/182 |

OTHER PUBLICATIONS

Kok–Meng Lee, "On The Development Of A Compliant Grasping Mechanism For On–Line Handling Of Live Objects, Part I: Analytical Model," 1999 IEEE/ASME International Conference on Advanced Intelligent Mechatonrics (AIM'99), Sep. 19–23, Atlanta, GA USA.

(List continued on next page.)

Primary Examiner—Peter M. Poon
Assistant Examiner—David Parsley
(74) Attorney, Agent, or Firm—Thomas, Kayden, Horstemeyer & Risley

(57) ABSTRACT

A system and method for transferring live objects, such as chickens, to a shackle line are presented. The system and method include introducing a plurality of live objects to a singulator. The singulator isolates the individual live objects and places them in a pallet on a conveyor. The system may detect and remove cadavers from amongst the live objects. The conveyor leads the live objects to a grasper. The grasper positions the legs of the live objects so that a shackler can secure the legs of the live objects with a shackle. The live objects and the shackle are then inverted and passed on to a shackle line. The shackle line may be a kill line buffer or a kill line.

24 Claims, 13 Drawing Sheets

OTHER PUBLICATIONS

Kok–Meng Lee, A. Bruce Webster, Jeffry Joni, Xuecheng Yin, Richard Carey, Michael P. Lacy, Rishi Gogate, "On The Development Of A Compliant Grasping Mechanism For On–Line Handling Of Live Objects, Part II: Design and Experimental Investigation," 1999 IEEE/ASME International Conference on Advanced Intelligent Mechatonrics (AIM'99), Sep. 19–23, Atlanta, GA USA.

Kok–Meng Lee, Rishi Gogate, Richard Carey, "Automated Singulating System For Transfer Of Live Broilers," Proceedings of the 1998 IEEE International Conference on Robotics and Automation, May 16–21, Leuven, Belgium.

Kok–Meng Lee, "Kinematic Simulation And Analysis Of A High–Speed Live Broiler Transfer Mechanism," Proceedings of the 2000 Japan–USA Symposium on Flexible Manufacturing Systems, Jul. 23–26, Arbor, MI.

Daniel Fletcher, "Integrator's Digest", Jun. 1995, p. 97.

BTG, "Automatic Chicken Shackling," Dec. 1995, Reference: 134332.

* cited by examiner

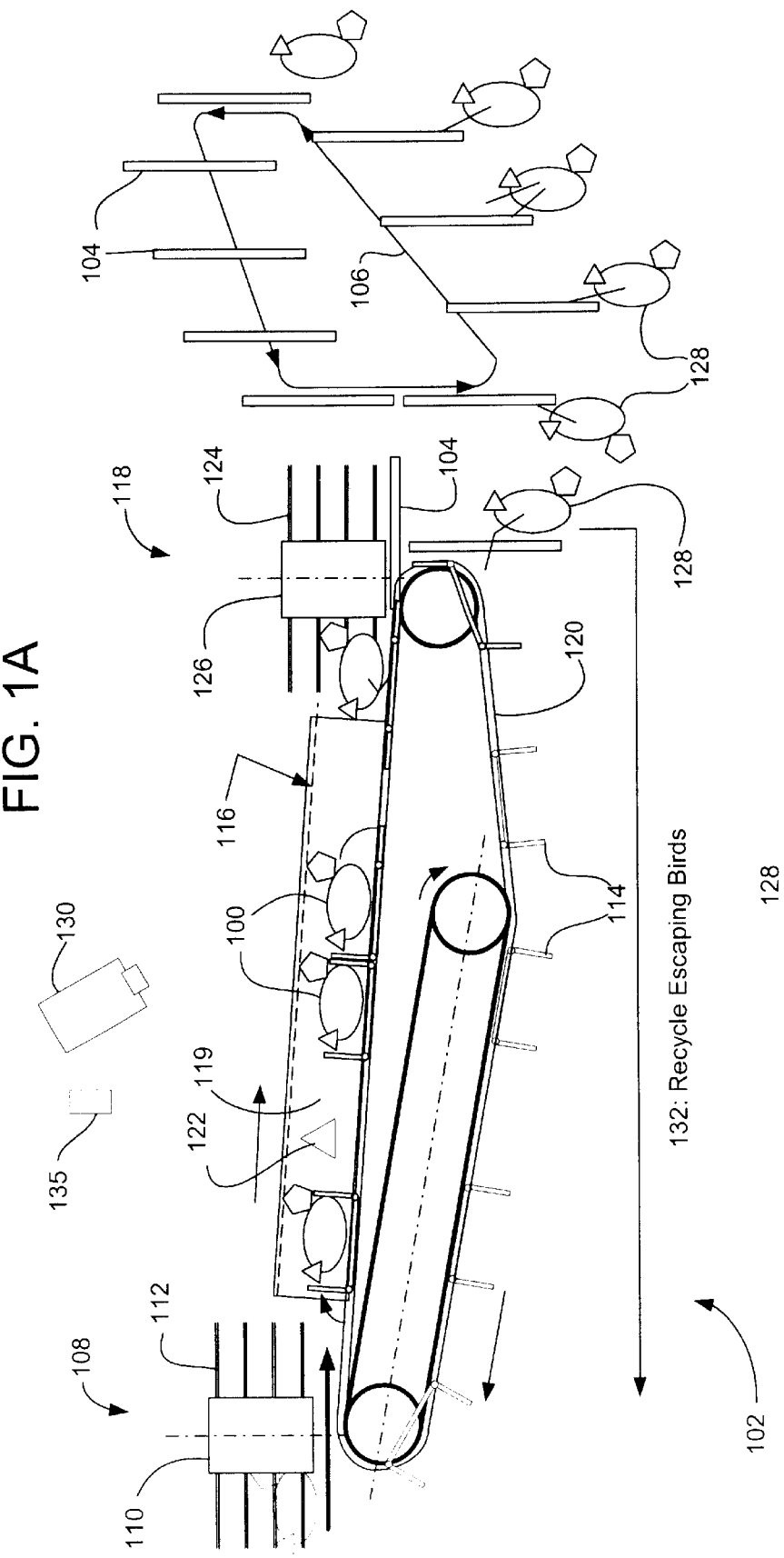

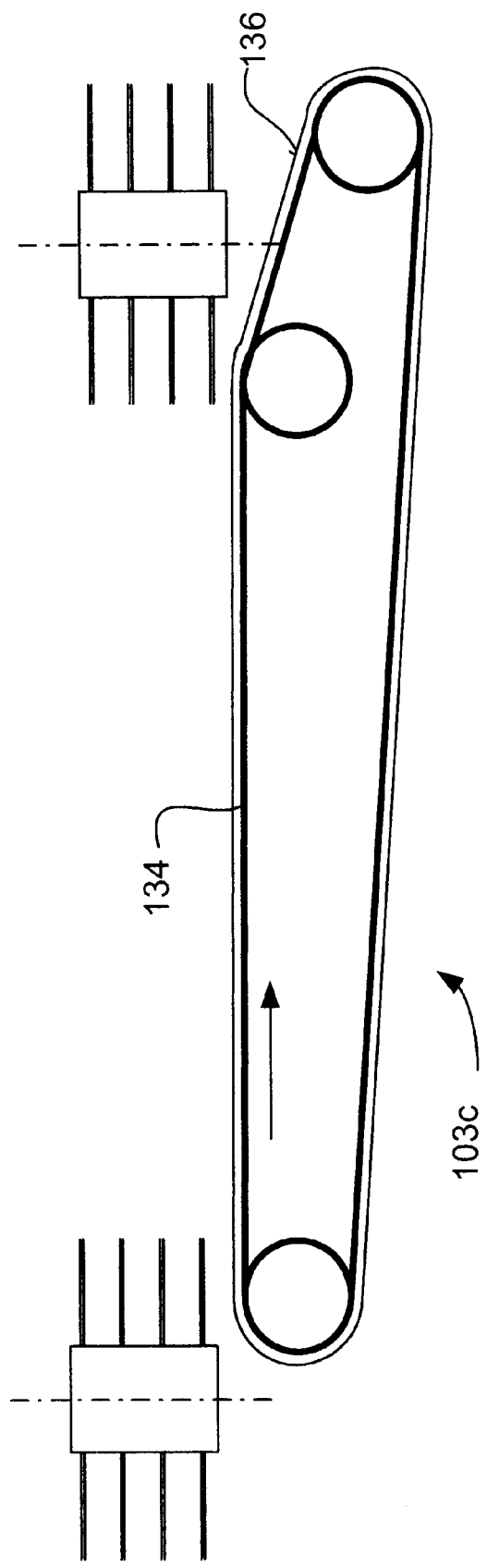

Singulating System

Leg Gripping

Awaiting Shackle

Rotated Shackle

Shackle (a) Compliant Shackle

Imaging System

Imaging Neural Network

Imaging Neural Network

FIG. 8A
Plots for Use with a Neural Network
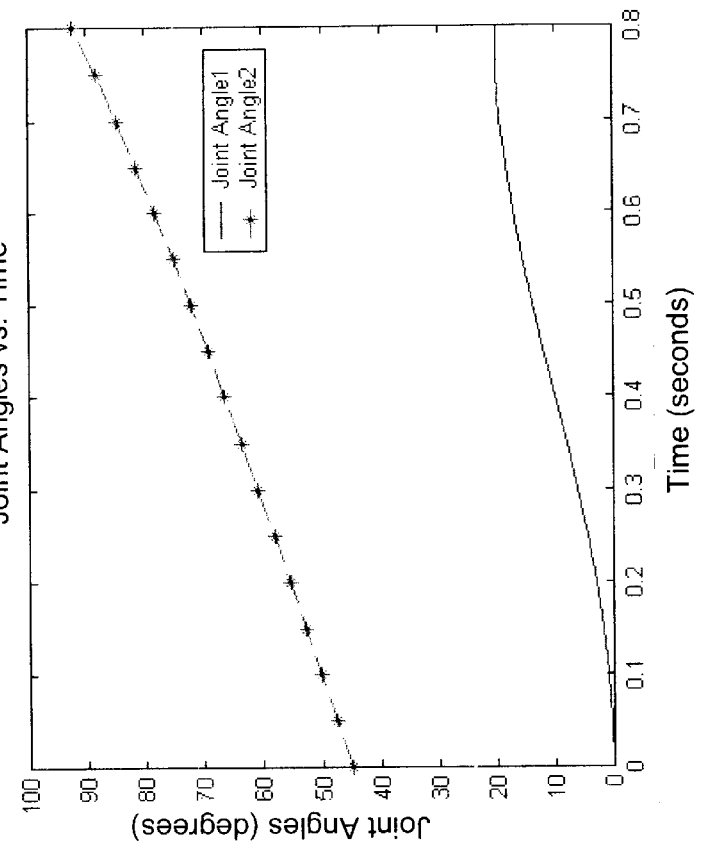
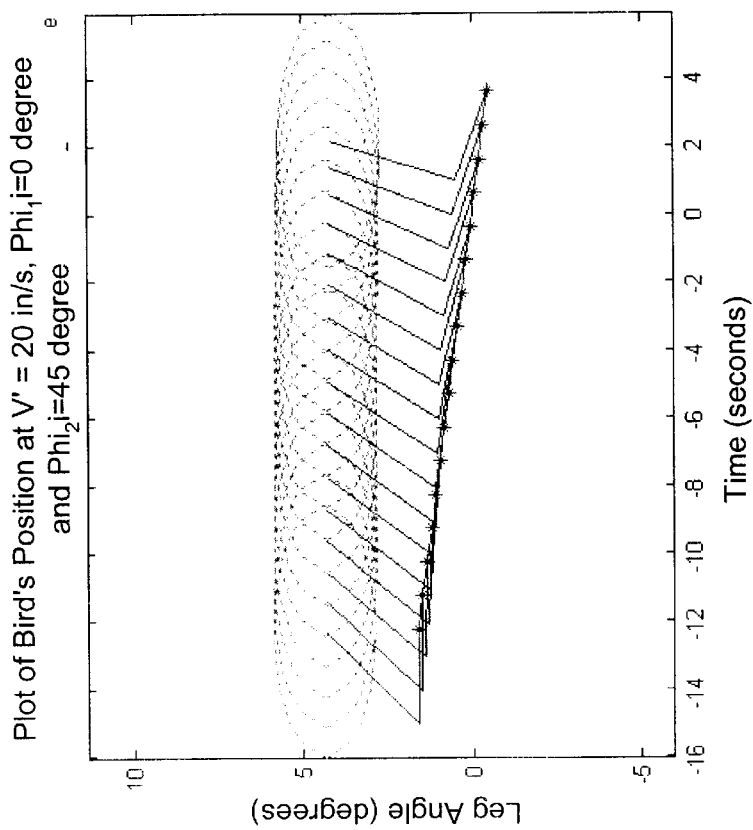

Plots for Use with
a Neural Network

Plots for Use with a Neural Network

System Operation Control Sequence

AUTOMATED TRANSFER OF LIVE OBJECTS TO SHACKLE LINE METHOD AND APPARATUS

CROSS-REFERENCE TO RELATED APPLICATION

This application claims priority to four abandoned U.S. provisional applications all entitled "Method of Mechanical Transferring Live Broilers from Moving Conveyor to Shackle," having ser. Nos. 60/171,990, filed Dec. 23, 1999; 60/177,576, filed Jan. 22, 2000; 60/197,362, filed Apr. 15, 2000; and 60/252,987, filed Nov. 23, 2000; which are entirely incorporated herein by reference.

STATEMENT REGARDING FEDERALLY SPONSORED RESEARCH OR DEVELOPMENT

The U.S. government and the Georgia Agricultural Technology Research Program may have a paid-up license in this invention and the right in limited circumstances to require the patent owner to license in this others on reasonable terms as provided for by the terms of U.S. Poultry and Eggs Association (U.S. P&E) Project Nos. #333,413 and 446 both entitled "Intelligent Automated Transfer of Live Birds to Shackle Line."

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

1. Technical Field

The present invention is generally related to the transfer of live objects to shackle lines and, more particularly, is related to a system and method for organizing, restraining and transferring live chickens from a farm to a processing facility.

2. Background of the Invention

Manual handling of live birds is a hazardous and unpleasant task. There are potentials for a variety of injuries to human handlers since the birds tend to flail about when they are caught. Potential injuries include: cuts and scratches that can easily become infected in a chicken farm environment; a variety of respiratory and visual ailments resulting from the high level of dust and feathers; hands or fingers can get caught in moving shackle lines; and repetitive motion disorders. The unpleasantness associated with the manual handling of live birds results in high employee turnover rates at some plants. The high turnover rate results in the need to constantly retrain new employees. In addition, it is difficult to attract new workers to the job. In addition, manual handling of live birds may lead to bruising and downgrading of birds.

Despite the drawbacks, live birds are usually handled manually (from hatching through processing). The reason for manual handling is handling of live birds by automation presents unique challenges, such as the following: (1) Unlike handling of non-reactive objects, both the mechanical forces and the bird's natural reflexes contribute to the overall dynamics; (2) Live birds vary in size and shape, making handling automation difficult; (3) Since both the birds and the grasping fingers are compliant, contact forces depend on the surface geometry and are position/orientation dependent; and (4) In order to justify the need for automation from a cost-savings viewpoint, the mechanical devices must perform the repetitive task in a shorter amount of time, and with more accuracy, than a human.

Thus, a heretofore unaddressed need exists in the industry to address the aforementioned deficiencies and inadequacies.

SUMMARY OF THE INVENTION

The present invention provides a system and method for transferring live objects to a shackle line.

Briefly described, in architecture, the system can be implemented as follows.

A plurality of live objects are introduced to a singulator. The singulator isolates the individual live objects and places them in a pallet on a conveyor. The system may detect and remove cadavers from amongst the live objects. The conveyor leads the live objects to a grasper. The grasper positions the legs of the live objects so that a shackler can secure the legs of the live objects with a shackle. The live objects and the shackle are then inverted and passed on to a shackle line. The shackle line may be a kill line buffer or a kill line.

The present invention can also be viewed as providing a method for automatically transferring a plurality of live objects with legs to a shackle line. In this regard, the method can be broadly summarized by the following steps: isolating each of the plurality of live objects; conveying the live objects to a grasper; positioning the isolated live objects with the legs of the live objects extended; securing the legs of the live objects to one of a plurality of shackles; inverting the live objects; and hanging each of the isolated live objects by the shackle.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a side view of a preferred embodiment of the system for transferring live objects to a shackle line including a declined conveyor.

FIG. 1C is a third embodiment of the system for transferring live objects to a shackle line including a conveyor with a relatively flat portion and a declined portion.

FIGS. 8A–8C are sample plots for use in controlling the system for transferring live objects to a shackle line of FIGS. 1A–1C through the use of the neural network of FIGS. 7B and 7C.

DETAILED DESCRIPTION OF THE PREFERRED EMBODIMENT

Figure 1B:
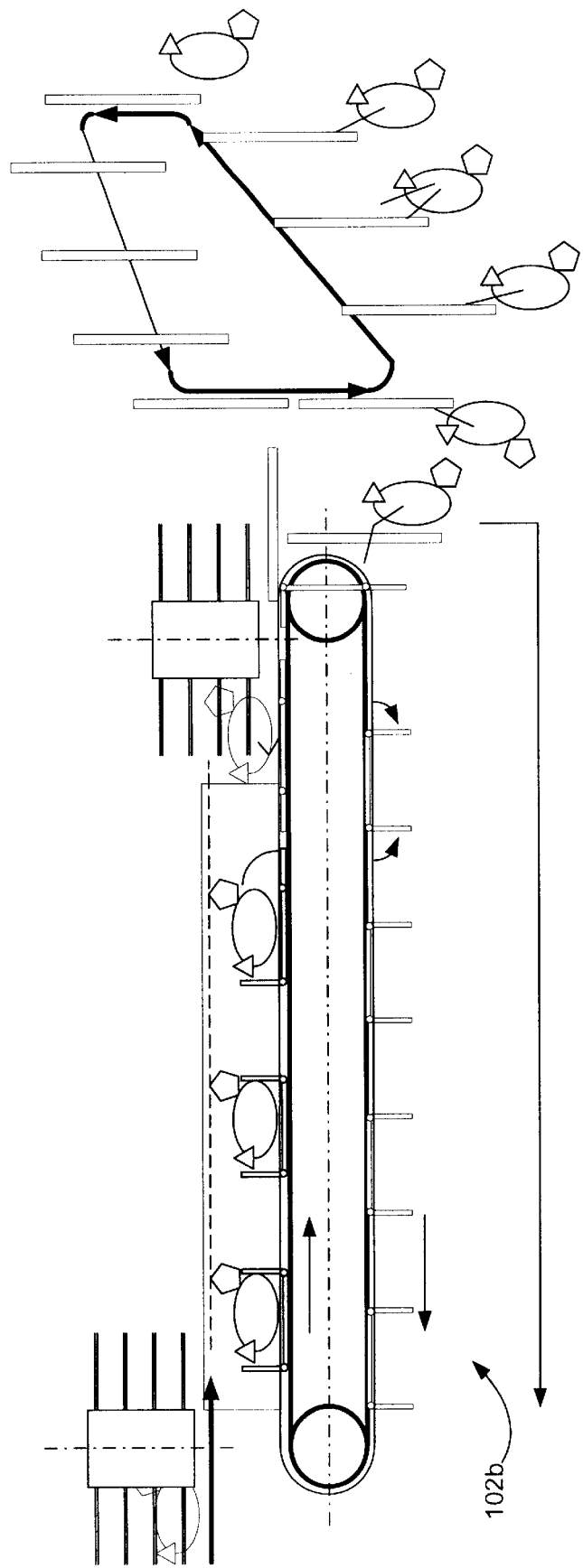
FIG. 1B is a side view of a second embodiment of the system for transferring live objects to a shackle line including a relatively flat conveyor.

FIG. 1A is a side view of a preferred embodiment of the system for transferring live objects to a shackle line including a declined conveyor. FIG. 1A shows an automated system for transferring live objects, such as chickens 100, from a moving non-slip conveyor 102 to shackles 104 on a shackle line 106. A typical cycle of the system begins with the chickens 100 being unloaded from cages (not shown) onto a moving singulating entry conveyor (202 of FIG, 2). The singulating conveyor 202 transfers the birds to a singulator 108. The singulator 108 includes two separate hollow cylinders 110 (only one shown in the side view of FIG. 1). Each hollow cylinder 110 includes a set of counter-rotating fingers 112 mounted on the hollow cylinders 110.

The singulator 108 serves two functions. The first function is to cause the chickens 100 to stand. The second function is to isolate the chickens 100 so that they leave the rotating fingers 112 one at a time. As the cylinders 110 are rotated, tangential motion disperses the chickens 100 over the periphery of the rotating cylinders 110 while centripetal and gravitational forces cause the chickens 100 to move away from the cylinders 110 and drop onto the moving conveyor 102. The singulator 108 may also include a re-orienter (not shown) that may sense the direction the chickens 100 are facing and turn some chickens 100 so that all chickens 100 are facing forward.

Each of the cylinders 110 is driven by independent servomotors (not shown) rotating in opposite direction. The cylinders 110 each support a number of columns of evenly spaced rubber fingers 112. The use of counter-rotating fingers for electronic counting of live objects is known to those skilled in the art. The fingers 112 are compliant to accommodate the range of chickens 100. The fingers 112 are generally oval shaped to provide stiffness in the plane of travel and pliancy perpendicular to the plane of travel. The fingers generally have a rough surface to assist in maintaining contact with the chickens 100. The cylinders 110 are spaced sufficiently apart that only one chicken can pass through at a time.

The singulator 108 deposits the isolated chickens in one of a number of pallets 114 secured to the conveyor 102.

The chicken 100 is then transported on the conveyor 102 in the pallet 114 through an enclosed space with a low ceiling 116 where the chicken is confined to sit. Confining the chicken 100 to sit leads to a more uniform posture as the chickens 100 approach the grasper 118. The enclosed space is bounded by a pair of walls 119 to prevent the chickens 100 from voluntarily re-orienting themselves. The pallets 114 may be secured to the conveyor 102 frame by a rail 120.

The singulated chickens 100 may then be led through a cadaver detection system (CDS) consisting of a light emitting diode (LED) 122 and a photo-diode light detector (not shown). Each live chicken 100 immediately exiting the singulator 108 will be in a standing position distinctly different from that of any cadavers, this information is used to detect and remove cadavers from the automated system. The pair of walls 119 are transparent where necessary for the operation of the LED 122.

The singulated live chickens 100 are directed to a grasper 118 that includes a second system of counter-rotating fingers 124, which gently constrain the chickens 100 to allow the shackling to take place. Near the end of the conveyor 102, while the revolving fingers 124 of the grasper 118 continuously roll the chicken 100 forward, the leg kinematics of the chicken 100 are manipulated by appropriately controlling the grasper cylinder 126 speed relative to the conveyor 102 speed such that both legs of the chicken 100 are directed into the graspers 502 (of FIG. 5A) of an awaiting shackle 104 before the fingers 124 release the chicken 100. In the shackling operation, the grasper 118 constrains the chicken 100 and the chicken's legs are extended so the shackle 104 can secure the chicken's legs. The automatic transfer system described here does not require the chicken 100 to stand on its own will. Instead, it includes the rotating grasper fingers 124 to support the chicken 100 and uses a pre-determined body-to-feet differential speed to present both legs of the chicken 100 to the shackle 104.

Prior to entering the grasper 118, the chickens 100 may be held in a buffer on the conveyor. The buffer timing may be controlled by the system controller of FIG. 9.

Once the shackle 104 grips the chicken's legs, the chicken 100 and the shackle 104 are moved as a bird/shackle combination 128 towards the end of the conveyor 102. As shown in attachment G Principles of Operation, subsection "Forward Kinematics," the motion of the chicken's legs can be analyzed and predicted by appropriately controlling the velocities of the conveyor 102 and the rotating grasper cylinders 126. Attachment G, subsection "Inverse Kinematics," also shows the method to determine the rotating speed of the cylinders of the singulator 108 and the grasper 118 for a given conveyor speed, relative inclination of the rotating axis with respect to the conveyor 102 surface, and the chicken 100 size and entering pose. These calculated parameters will vary depending upon the environmental conditions and the variability in batches of live objects.

The variability within a particular batch can be calculated and used to control the automated system by use of an imaging system including a camera 130. To account for the varying sizes and entering posture, a digital (line or area) camera 130 with a collocated blue light source 402 (see FIG. 4) (or light with blue filter) can be placed before the entrance of the grasper 118, preferably before the grasper cylinder 126 to obtain a silhouette of the chicken 100 against a retroreflective surface 404 background (such as a 3M Scotchite 580 Black). From the silhouette, the size and the posture (the orientation of the major axis of the chicken 100), and the leg posture can be computed. Typically, the chickens 100 are placed in a dark room (or room illumination with dim blue light) to calm the chickens 102. The combined retro-reflective background and the collocated blue filtered light source 402 reduce the computational load of the image processing. The ceiling 116 is made transparent where necessary for the operation of the camera 130. Once the chicken 100 orientation (forward or backward) and leg posture point angles) is computed, the operating speed can be determined in order to manipulate the legs of the chicken 100 using the equations given in the attachment G, subsection "Inverse Kinematics," to re-adjust the rotational speed and compensate for the size/pose variation in real-time.

The weight of the bird/shackle combination 128 causes the bird/shackle combination 128 to topple and thus inverts the bird/shackle combination 128. The shackle 104 with the hanging chicken 100 is then transferred to the moving shackle line 106 which may be a buffer line or may be a kill line.

As shown in FIG. 1, in the preferred embodiment, the conveyor 102 declines slightly from the singulator 108 to the grasper 118. The conveyor is designed to incline downward so that the grasper fingers 124 grasp the chicken 100 by its body but allow the legs to extend freely between the hip joints and the feet on the conveyor 102 surface. The inclined surface further encourages the chicken 100 to sit since the bird's natural reflexes to moving on an inclined plane is to lower its center of gravity (CG) in order to maintain its balance.

For high-speed transferring operation, it is desired that the variation of the (initial) birds' posture as they enter the grasper 118 be minimized. Since most chicken's arriving at the system tend to sit (particularly in a relatively dark environment), the "sitting" posture is chosen as a nominal entry posture in the design and control of the automated transfer system. The system includes a ceiling 116 and clear walls 119 that cover and close the sides, respectively, of the conveyor 102. The ceiling may also extend to reach partially into or over the grasper 118. The walls 119 and ceiling 116 are clear to allow visibility, to allow for identifying carcasses, and to allow CDS imaging with the LED 122 and orientation imaging with the camera 130. The system for transferring live objects to a shackle line also includes a recycle conveyor 132 for transporting any escaping chickens back to the singulator 108 area.

FIG. 1B is a side view of a second embodiment of the system for transferring live objects to a shackle line including a relatively flat conveyor. The components of the second embodiment are similar to the components of the preferred embodiment other than the conveyor 102b that is relatively flat.

FIG. 1C is a third embodiment of the system for transferring live objects to a shackle line including a conveyor with a relatively flat portion and a declined portion. The components of the third embodiment are similar to the components of the preferred embodiment other than the conveyor 103c that has a relatively flat portion 134 and a declined portion 136.

Figure 2:
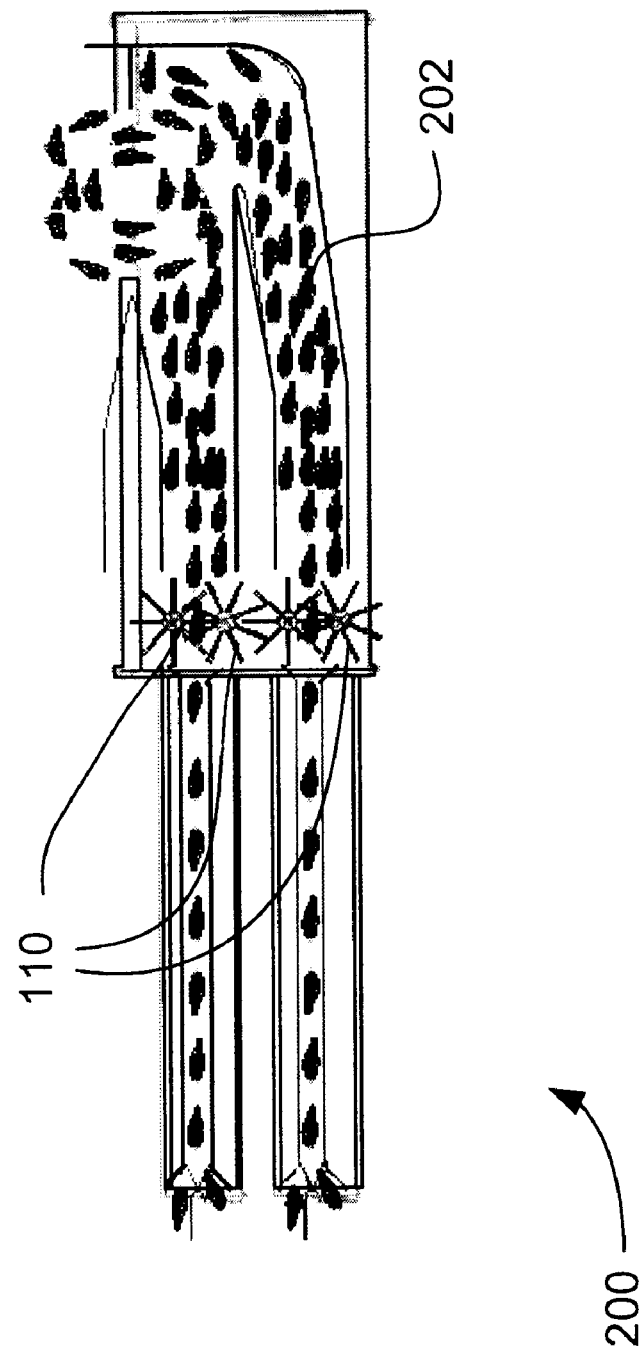
FIG. 2 is a top view of the singulating system for transferring live objects to a shackle line of FIGS. 1A–1C

FIG. 2 is a top view of the singulating system 200 for transferring live objects to a shackle line of FIGS. 1A–1C. The singulating system 200 is shown as a dual line system but may be a single line system for the present invention. The singulating system includes a singulating conveyor 202 and a singulator 108 for two lines showing the use of two singulating cylinders 110 for each line of the singulating system.

Figure 3:
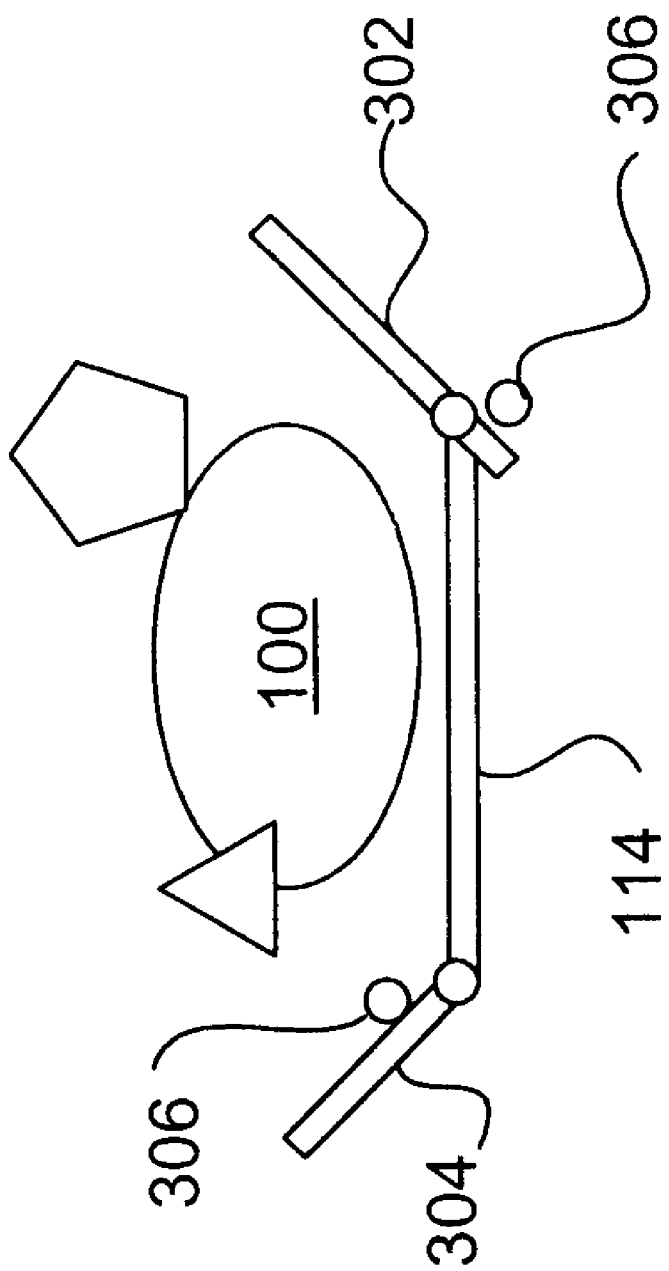
FIG. 3 is side view of a pallet that is attached to the conveyor of the system for transferring live objects to a shackle line of FIGS. 1A–1C.

FIG. 3 is side view of one of the pallets 114 that are attached to the conveyor of the system for transferring live objects to a shackle line of FIGS. 1A–1C. The chicken 100 is dropped from the singulator 108 into the pallet 114. The pallet 114 includes a pair of latchable panels (front 302 and back 304) to restrain the chicken 100 from walking on the conveyor 102. Immediately after the chicken 100 is dropped into the pallet 114, the rear panel 304 of the pallet 114 is lowered. The chicken 100 will generally try to balance itself by lowering its center of gravity. After the chicken 100 enters the pallet 114, the rear panel 304 is raised. The panels 302 and 304 are unlatched and flattened before entering the grasper 118, and thus minimizing the visual response of the chicken 100 to the revolving fingers 112 of the grasper 118. The panels 302 and 304 return to the original positions by gravity. The panels may be raised and lowered by pins 306.

The pallets 114 rotate with the bird/shackle combination 128 at the end of the conveyor 102. Rotating the pallets with the bird shackle combination 128 prevents any escaping chickens 100 from being trapped between the conveyor 102 and the shackle 104, thus, allowing the escaping chicken 100 to be dropped on the recycling conveyor 132 unhurt. Since the pallet 114 is rotated with the chicken 100, the chicken's resistance by gripping on the floor of the pallet 114 has no effect on the inverting process. And, since the time required to invert the chicken 100 depends only on the rotational speed, it significantly minimizes the chicken's 100 struggle.

As compared to the conveyor 102, individual pallets 114 also offer an advantage for controlling the leg kinematics of the chicken 100. The chicken 100 is sensitive to the declination of the conveyor 102 surface. The portion of the conveyor 102 surface, where the incoming chickens 100 are on the queue, is kept constant in order to minimize the chicken's 100 natural reflexes. The degree that the rotating axes of the grasper cylinder 126 can be tilted is limited since the grasper fingers 124 would interfere with the declined conveyor 102.

On the other hand, individual pallets 114 are short and can travel on a much steeper inclined track below the grasper fingers 124. In addition, the conveyor 102 is designed such that as the chicken 100 is grasped at a constant height, the pallet 114 is lowered, where the legs are inserted to the shackle 104, then the conveyor 102 is tilted as the pallet 114 and shackled chicken 100 are moving forward, and finally the bird/shackle combination 128 is inverted, and the bird/shackle combination 128 is separated from the pallet 114. Thus, the use of the pallet 114 provides a more effective means to insert the leg into the shackle 104 before inverting the chicken 100.

Figure 4:
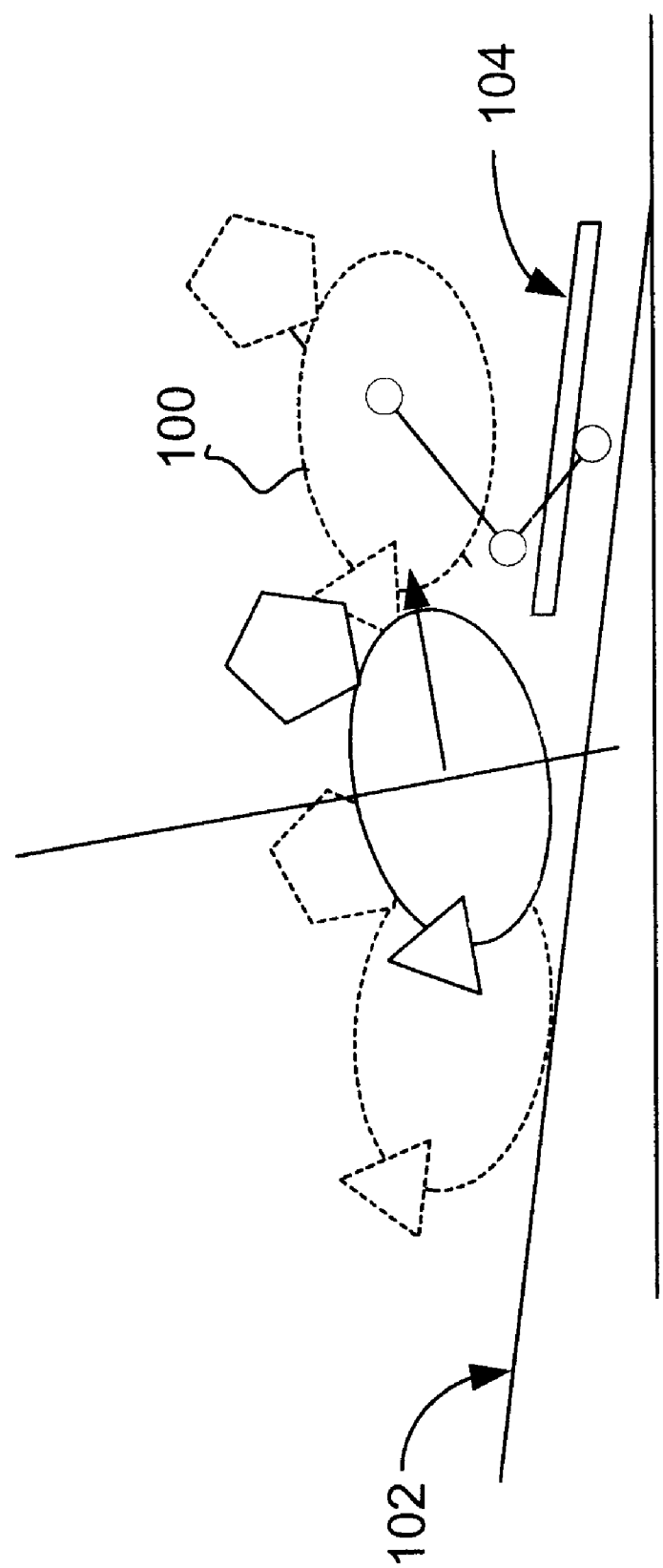
FIG. 4 is a diagram showing the lifting of a live object and the securing of the legs of the live object with a shackle that is a part of the system for transferring live objects to a shackle line of FIGS. 1A–1C.

FIG. 4 is a diagram showing the lifting of a live object and the securing of the legs of the live object with a shackle that is a part of the system for transferring live objects to a shackle line of FIGS. 1A–1C. FIG. 4 shows the surface of the conveyor 102, the shackle 104, and the chicken 100 to be shackled. FIG. 4 shows the chicken 100 as the chicken 100 is passing through the grasper 118. For any particular conveyor 102 slope and speed, the velocity of the chicken's 100 body must be lifted over the shackle 104 and the shackle 104 must grip the legs of the chicken 100.

Figure 5B:
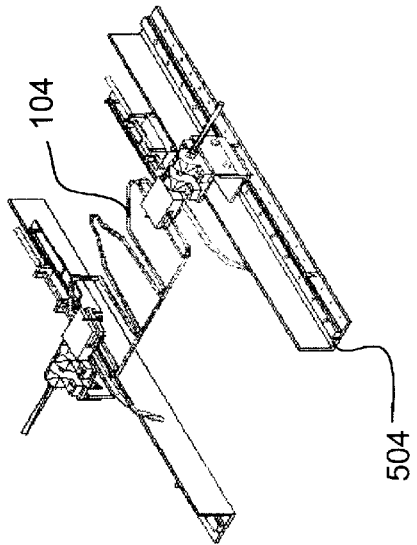
FIGS. 5B and 5C show perspective views of the shackle and shackle support awaiting the arrival of a live object (FIG. 5B) and the rotated shackle and shackle support (FIG. 5C) rotated as it would be while securing the legs of the live object.
Figure 5C:
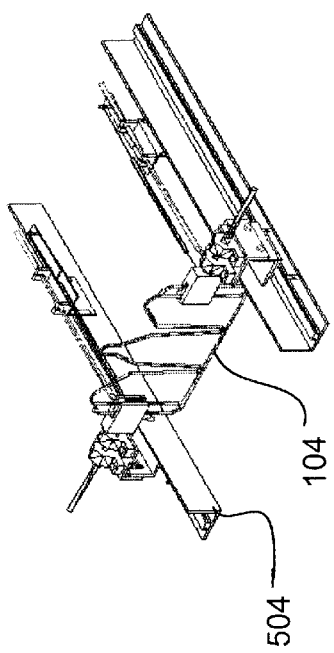
Figure 5A:
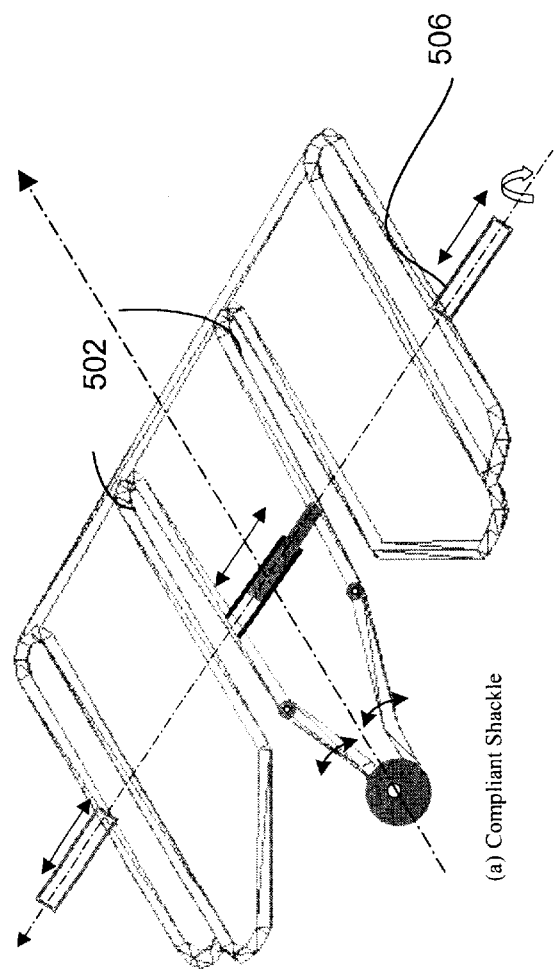
FIG. 5A. is a perspective view of the shackle for securing the legs of a live object shown in FIG. 4.

FIG. 5A. is a perspective view of the shackle 104 for securing the legs of the chicken 100 shown in FIG. 4. The shackle includes a gripping area 502 for securing the legs of the chicken 100 when the bird/shackle combination 128 is inverted and a shackle support 506.

FIG. 5A shows a compliant shackle, which is designed to adapt non-symmetric insertion of the legs. By allowing the spacing between the two gripping areas 502 to slide freely, the shackle provides negligible resistance along the Ys direction but provides a relatively high stiffness in the Xs direction. Thus, the design allows the legs of different spacing as well as different arrival timing to be inserted before moving them along the Xs direction.

FIGS. 5B and 5C show perspective views of the shackle 104 and the shackle support 504 awaiting the arrival of a chicken, FIG. 5B, and the rotated shackle 104 and shackle support 504 in the position the shackle is as the bird/shackle combination 128 is inverted.

Figure 6:
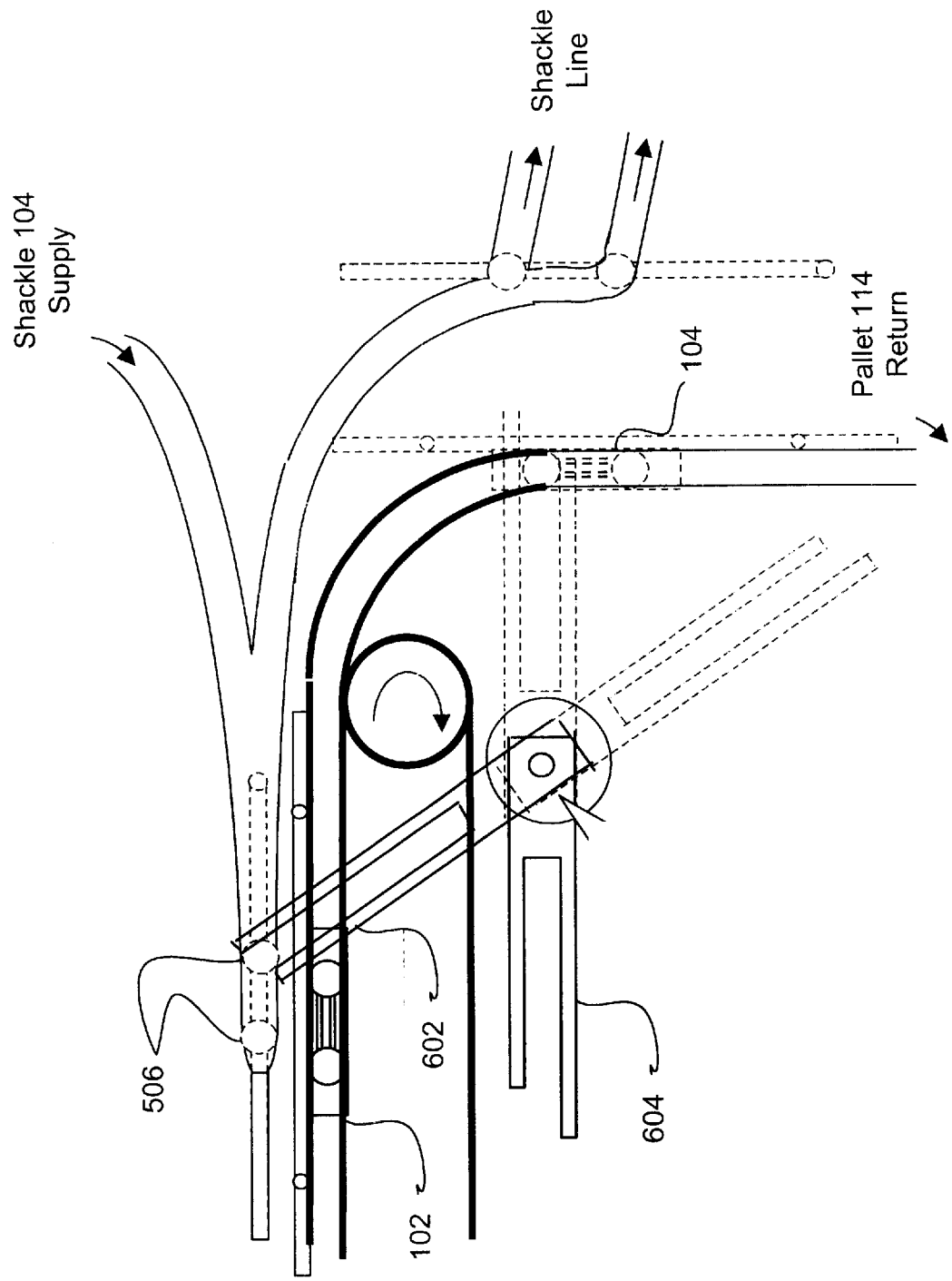
FIG. 6 is a side view of the system for synchronizing the inversion of the shackle of FIG. 4, the live object, and the pallet of FIG. 3.

FIG. 6 is a side view of the system for synchronizing the inversion of the shackle 104, the chicken 100, and the pallet 114. FIG. 6 shows a shackle 104 entering the at the top right, a first slider 602 that positions an empty shackle 104 by the shackle support 506 such that it provides a restoring force when the legs of the chicken 100 are engaged in the shackle 104. The bird/shackle combination 128 travels towards the end of the conveyor 102, where the second slider 604 engages the pallet 114. As the relative angular positions of the two sliders 602 and 604 are fixed, the pallet 114 and the bird/shackle combination 128 are synchronized to rotate together. Once the bird/shackle combination 128 rotates, the pallet 114 is separated from the bird/shackle combination 128. A servomotor (not shown) controls the shackle 104 motion and synchronizes the rotational motion of the pallet 114, shackle 104, and the bird/shackle combination 128. Once the grasper 118 engages the legs, the servomotor behaves as a rotational spring, and exerts a restoring force such that the legs of the chicken 100 are driven further into the shackle 104, while allowing the bird/shackle combination 128 to travel together.

The cam motion of the shackle 104 is designed such that: The conveyor feeds the legs of the chicken 100 to the gripping area 502 of the shackle 104 while the rotating fingers 124 push the bird out of the grasper 118; Once the legs are gripped, both the bird and the shackle are pushed together towards the end of the conveyor 102; At the end of the conveyor, the shackle/bird combination rotates under its own weight (or with additional counter-weight) along with the momentum contributed by the fingers and the conveyor; and once the broiler is inverted, the bird/shackle combination is available for transferring to a moving processing line.

There are several designs that could accomplish the above motion such as, the use of a mechanical spring 508 as illustrated in the figures; the use of a spring-loaded ball plunger so that the fingers/conveyor combination pushes the bird's feet to unlatch the plunger; and the use of a computer-controlled electromechanical linear motor position servo to drive the shackle mechanism.

A typical example position servo configuration is a P01-23x160/200x340 that includes position feedback and its associated power driver, control interface, and software manufactured by LinMot. The active shackle mechanism provides a flexible means to position the shackle using the spring-loaded ball plunger or to modify the stiffness using the mechanical spring 508. An alternative means to achieve the shackle motion control is to use a position-feedback cylinder, and its associated control valve and interface with the computer manufactured by Bimba Manufacturing Co. Yet another alternative means of achieving computer-control is to use a computer-controlled rotary motor with a reciprocating mechanism such as an Uhing Linear Drive Nut manufactured by Amacoil, Inc.

Figure 7A:
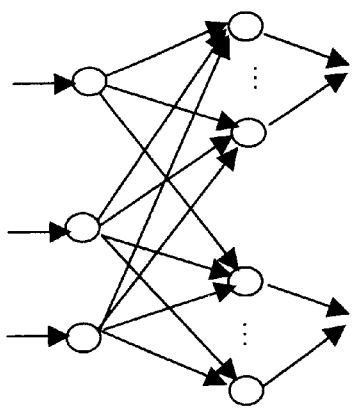
FIG. 7A is an imaging system for determining the orientation of the live objects of the system for transferring live objects to, a shackle line of FIGS. 1A–1C.

FIG. 7A shows an imaging system for determining the orientation of the live objects of the system for transferring live objects to a shackle line of FIGS. 1A–1C. The imaging system includes a camera 130, a light source 402, and a retro-reflective surface 404.

Figure 7C:
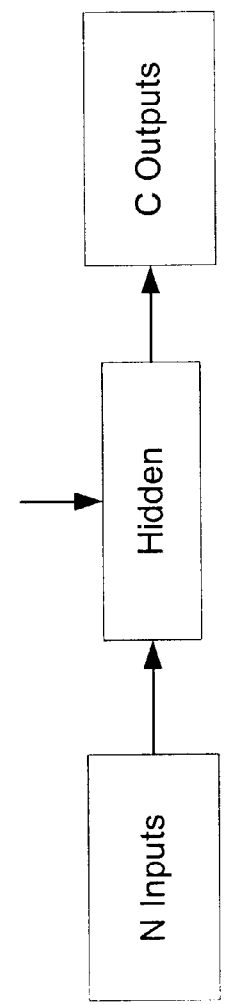
FIGS. 7B and 7C show a block and a node diagram of a neural network that shows one system for controlling the operation of the system for transferring live objects to a shackle line of FIGS. 1A–1C.
Figure 7B:
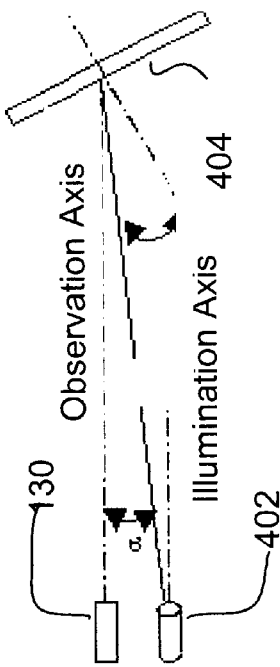

FIGS. 7B and 7C show a block and a node diagram of a neural network that shows one system for controlling the operation of the system for transferring live objects to a shackle line of FIGS. 1A–1C. An alternative method to determine the grasper cylinder 126 speed to compensate for the size and posture variation of the chickens 100 is to use a trained neural network algorithm with the following input-output training pairs, which could be prepared experimentally:

5 Inputs=[$w$; $h$, $\beta$; $\Phi_1(t_f)$, $\Phi_2(t_f)$]; 1 Output=$\omega$ where h and $\beta$ describe the height of the geometrical center and the orientation of the silhouette of the incoming bird. These parameters, which characterize the posture of the incoming bird, can be obtained using a digital camera 130 with image processing software. With the input-output pairs, the network can be obtained using Levenberg-Marquardt learning method (see, for example, the MATLAB Neural Net Toolbox Manual). Once the network is trained, it can be used to determine the drum speed needed for a particular set of inputs. A sample program, such as the one below can be used to obtain the leg posture from the chicken silhouette obtained from the digital camera.

Sample Program

```
range=[min(inputs) 'max(inputs)'];
rand('state',0);
num_vals=length(inputs);
index=randperm(num_vals);
% Split the training data set into training and validation sets
train_in=puts(index(1:floor(num_vals/2)),:)';
train_out=outputs(index(1:floor(num_vals/2)))';
validate.P=inputs(index(ceil(num_vals/2):num_vals))';
validate.T=outputs (index (ceil (num_vals/2):num_vals))';
% Form the initial network and set parameters
legnet=newff(range,[5 1],{'tansig' 'purelin'});
legnet.trainParam.epochs=50;
legnet.trainParam.show=[ ]
% Train using default Levenberg-Marquardt method
% See the NNET Toolbox manual.
[legnet,legperf]=train(legnet,train_in,train_out,[ ],[ ],validate);
FIG. (2) ,clf
semilogy(legperf.epoch',legperf.perf,legperf.epoch',legperf.vperf','--')
xlabel('Epoch Number'),ylabel('Mean Squared Error');
title_s=sprintf('Leg-motion NN Performance (Min training MSE=% g )', ...
min(legperf.perf));
title(title_s), legend('raining', 'Validation',0)
```

The above algorithm can be used to obtain the leg posture from the bird silhouette obtained digitally with 3 Inputs=[$w$; $h$, $\beta$, }; 2 Outputs=[$\Phi_1(t_f)$, $\Phi_2(t_f)$]

which can be used with the inverse kinematics to determine the operating speeds.

Figure 8B:
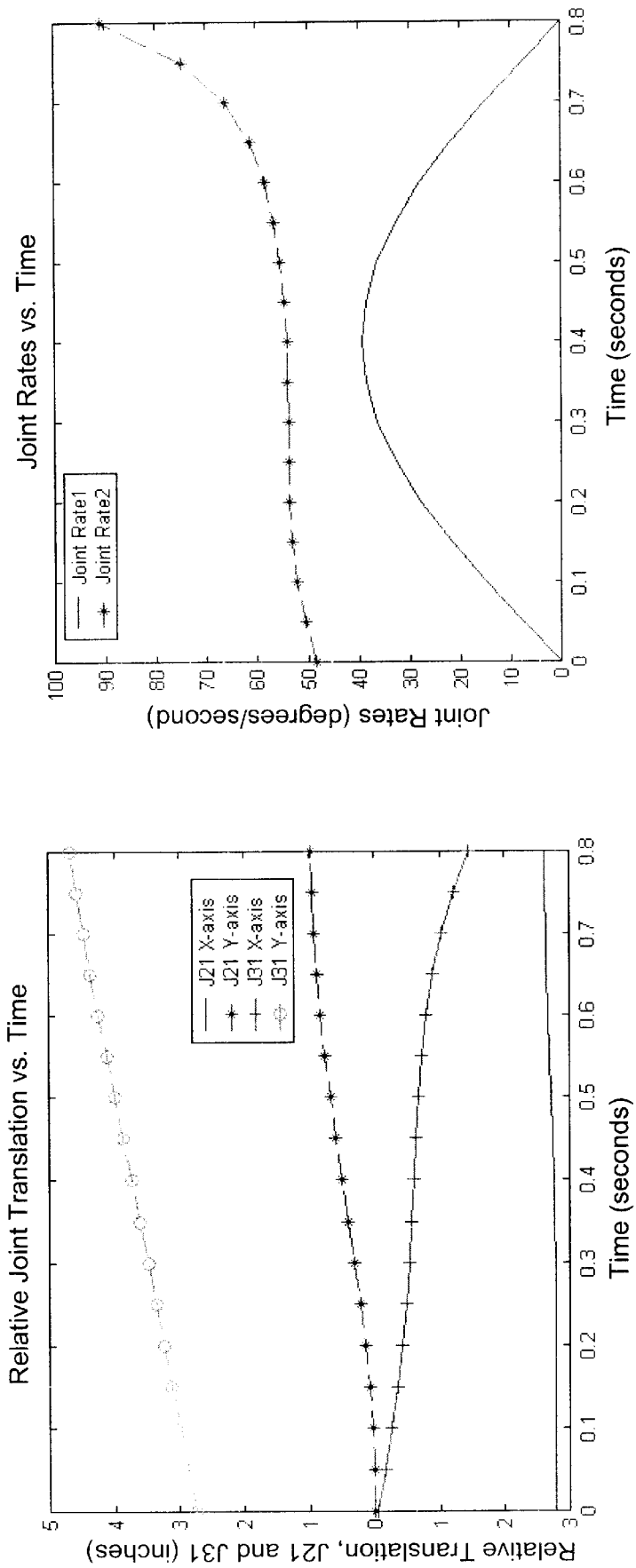
Figure 8C:
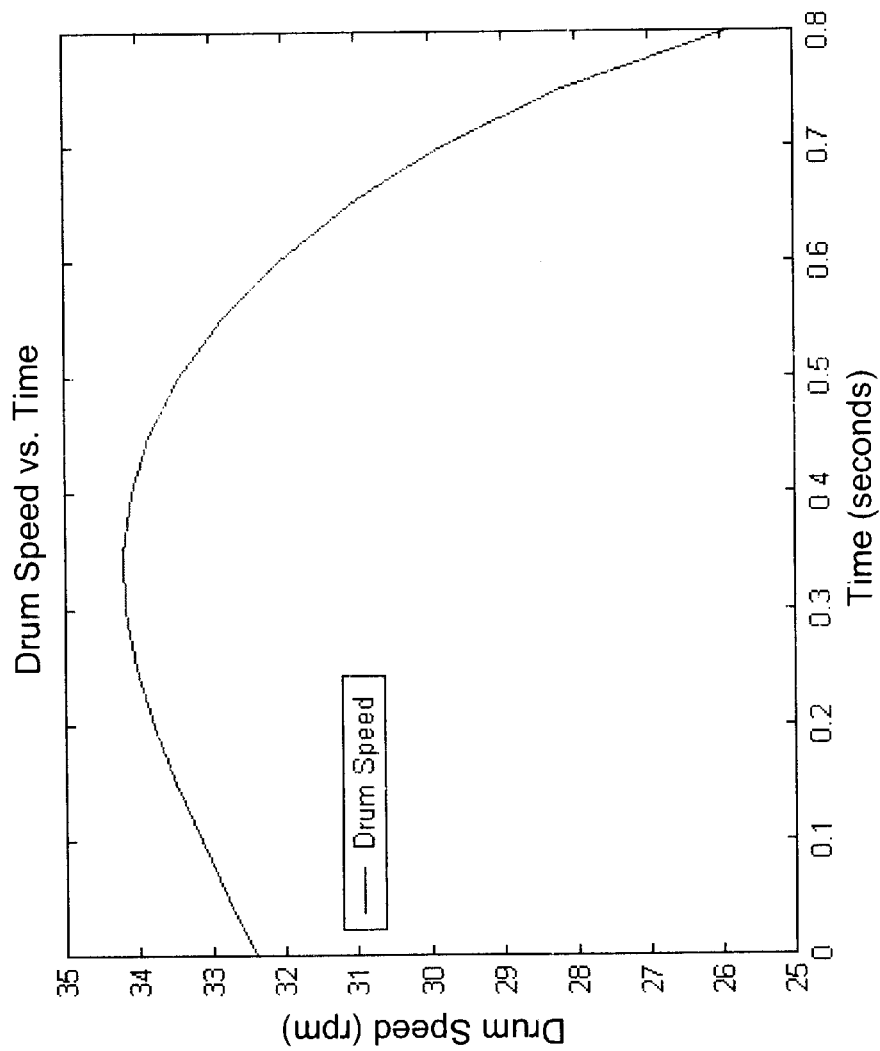

FIGS. 8A–8C are sample plots for use in controlling the system for transferring live objects to the shackle line 106 of FIGS. 1A–1C through the use of the neural network of FIGS. 7B and 7C.

Figure 9:
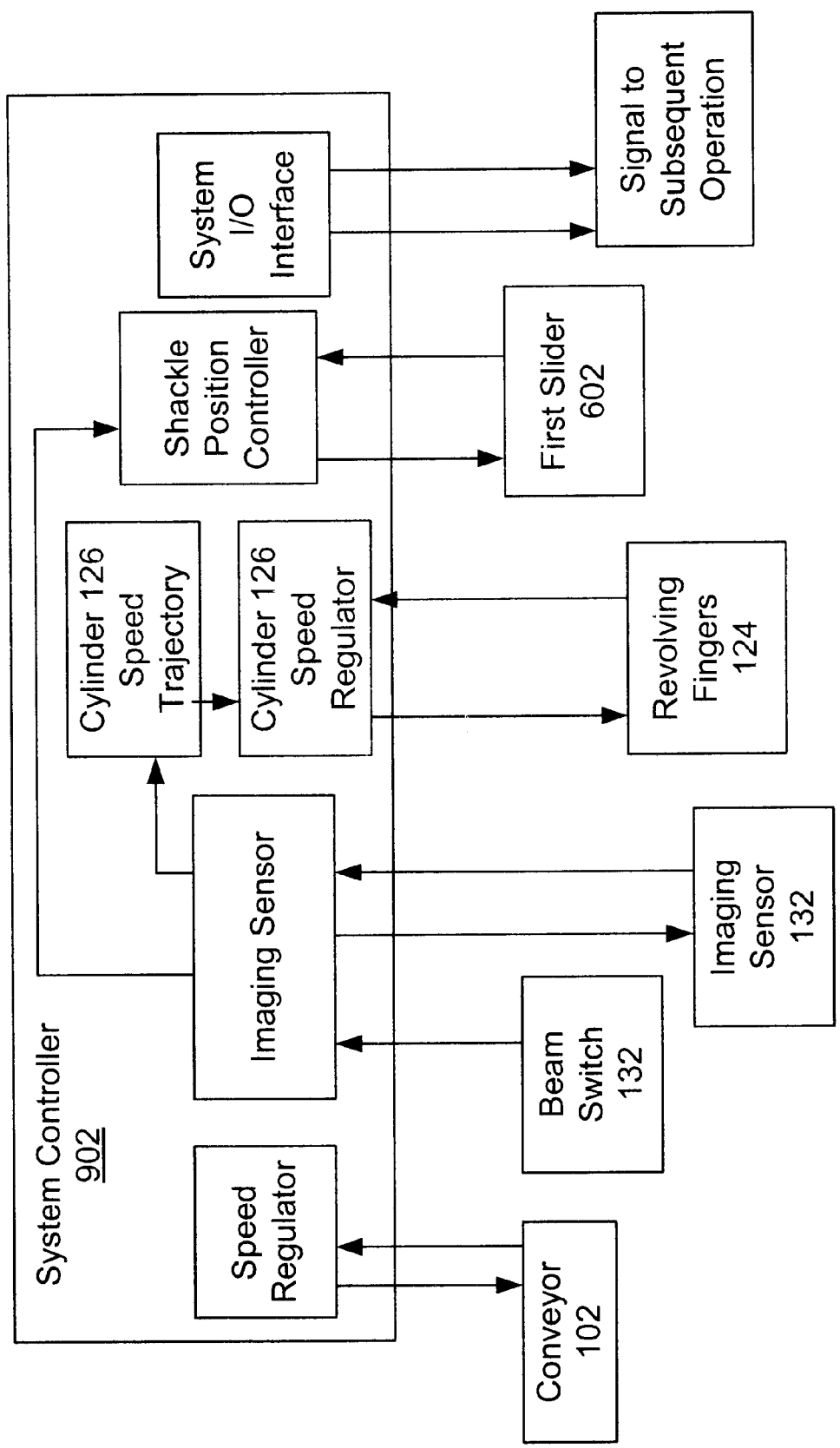
FIG. 9 is a block diagram of a system operation control sequence for controlling the operation of the system for transferring live objects to a shackle line of FIGS. 1A–1C.

FIG. 9 is a block diagram of a system operation control sequence for controlling the operation of the system for transferring live objects to a shackle line of FIGS. 1A–1C.

The operations of the system are controlled by a system controller 902. The system controller coordinates the following sequential tasks:

Continuous control of the conveyor 102 speed by a digital PID controller.

1*a*: voltage command;

1*b*: tachometer feedback

The beam-switch 133 signals the arrival of a chicken 100. The imaging sensing and control algorithm 3*a*: triggers the imaging sensor to capture an image of an incoming bird through the camera 130

3*b*. store and process image. The initial posture of the chicken 100 is computed.

3*c*: compute the desired grasper cylinder 126 speed profile

3*d*: compute the desired shackle 104 position

Control the grasper cylinder 126 speed by a digital PID regulator with a tracking controller.

4*a*: voltage command;

4*b*: tachometer feedback

Control the desired position by a digital PID controller.

5*a*: voltage command;

5*b*: position and force feedback

Signal the completion of the cycle.

Attachments A–J provide analytical models, design calculations, system criteria, kinematic simulation analysis, imaging system analysis, principles of operation, modeling, motion prediction analysis, and design algorithm related to the automated transfer of live objects apparatus and method. Attachments A–J are incorporated herein in their entirety by reference.

The neural network of the present invention can be implemented in hardware, software, firmware, or a combination thereof. In the preferred embodiment(s), the neural network is implemented in software or firmware that is stored in a memory and that is executed by a suitable instruction execution system. If implemented in hardware, as in an alternative embodiment, the neural network can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for transferring a plurality of live objects with legs to a shackle line, comprising:
    (a) a singulator, the singulator capable of isolating each of the plurality of live objects and depositing each isolated live object- on an individual pallet;
    (b) a grasper, the grasper having fingers that grasp the isolated live object around a body such that legs of the isolated live object extend in a substantially vertical direction, and wherein the body of the isolated live object is supported by the fingers of the grasper;
    (c) a conveyor, the conveyor having side walls and a portion that declines under the grasper such that the legs of the isolated live object can extend, and wherein the pallet is movably affixed to the conveyor, and wherein the conveyor is configured to traverse in a continuous motion, and wherein the conveyor is capable of transporting the isolated live object on the pallet in a single continuous motion on the conveyor from the singulator to the grasper; and
    (d) a shackle, the shackle is movably positioned substantially below the grasper and including a pair of grippers for gripping the extended legs of the isolated live object and wherein the shackle is configured to grip the extended legs of the isolated live object, and wherein the conveyor inverts under the grasper to invert the pallet and combination of shackle and isolated live object.

2. The system of claim 1, wherein the singulator includes a plurality of separate hollow cylinders for isolating each of the plurality of live objects therein, the plurality of separate hollow cylinders having a set of counter-rotating fingers mounted on the plurality of separate hollow cylinders.

3. The system of claim 1, wherein the pallets are secured to the conveyor.

4. The system of claim 1, wherein the pallets have a collapsible front and back portion.

5. The system of claim 1, further comprising a clear ceiling above a portion of the conveyor positioned to form an enclosed space within the pallet that confines the plurality live objects in a sitting position, and a clear ceiling over a portion of the grasper.

6. The system of claim 1, further including an imaging system, wherein the imaging system is capable of determining the orientation of the live objects while the live objects are being transported by the conveyor.

7. The system of claim 6, wherein the imaging system includes a trained imaging neural network.

8. The system of claim 1, wherein the shackle includes a shackle servo configured to control the shackle, and to synchronize a rotational motion of the pallet, shackle, and the isolated live object with legs gripped in the pair of grippers.

9. The system of claim 8, wherein the shackle servo further comprises a mechanical spring that provides for a cam motion of the shackle.

10. The system of claim 1, wherein the singulator includes a reorientation system configured to determine a direction the live objects are facing and to turn misdirected live objects such that each live object is facing towards the grasper.

11. The system of claim 1, wherein the system is controlled by a computerized system controller.

12. The system of claim 1, wherein speed of the grasper relative to the conveyor is maintained such that the legs of the isolated live object are directed into the grasper and the shackle before the fingers of the grasper release the isolated live object.

13. The system of claim 1, further comprising a buffer for holding the isolated live object on the conveyor prior to entering the- grasper.

14. The system of claim 13, further comprising a system controller for controlling the timing of the buffer.

15. The system of claim 1, wherein the conveyor further comprises an inverter adapted to receive and invert the isolated live object with legs gripped in the shackle.

16. An automated system for transferring a plurality of live objects with legs to a shackle line, comprising:
    (a) means for isolating each of the plurality of live objects and depositing the isolated live object on an individual pallet;
    (b) means for grasping a body of each isolated live object such that each isolated lived objects is positioned with the legs of the isolated live object extended in a substantially vertical direction;
    (c) means for conveying the isolated live object from the means for isolating to the means for positioning, the conveying means having a portion that declines under the means for grasping a body of the isolated live object and a portion that inverts, the conveying means moving in a continuous motion, and including a means for preventing the isolated live object from standing, the preventing means having a clear ceiling above a portion of the conveying means positioned to form an enclosed space within the individual pallet;
    (d) means for hanging the isolated live object by the legs of the isolated live object by the inverted portion of the means for conveying; and
    (e) means for securing the legs of the isolated live object to the means for hanging the isolated live object.

17. The system of claim 16, wherein the means for isolating includes a means for reorienting the isolated live objects, and wherein the reorienting means is configured to determine a direction the isolated live objects are facing and to turn misdirected isolated live objects such that each live object is facing towards the means for grasping a body of each isolated live object.

18. A method for automatically transferring a plurality of live objects with legs to a shackle line, comprising the steps of:
    (a) isolating each of the plurality of live objects;
    (b) conveying the isolated live object in a continuous motion in a pallet to a grasper having rotating fingers for grasping body of the isolated live object and for supporting the isolated live object in a substantially upright position such that the legs of the isolated live object can be extended in a substantially vertical direction;
    (c) positioning the isolated live object in the grasper in a substantially upright position such that the legs of the isolated live object can extend;
    (d) securing the legs of the isolated live object while in a substantially upright position to grippers affixed to each of a plurality of rotatable shackles and wherein the grippers are further configured to grip the extended legs of the isolated live object;
    (e) moving the pallet and shackled isolated live object forward while lowering the pallet until the shackled isolated live object inverts and the shackled isolated live object separates from the pallet; and
    (f) hanging each of the isolated live objects by the rotatable shackle.

19. The method of claim 18, further comprising the step of determining the orientation of the isolated live objects and adjusting a mis-directed isolated live object such that each isolated live object is facing towards the grasper for entering the step of securing the legs based on the orientation of the isolated live object.

20. The method of claim 18, further comprising holding the isolated live object in a buffer prior to positioning the isolated live object in the grasper, and wherein a buffer timing is controlled by a system controller.

21. The method of claim 18, further comprising controlling velocities between the conveying the isolated live object to the grasper and grasping the isolated live object to position the isolated live object with the legs extended such that the legs of the isolated live object are accurately secured into one of the plurality of shackles.

22. The method of claim 18, further comprising predicting the motion of the legs of the isolated live object to appropriately control the securing the legs of the isolated live object to one of a plurality of shackles.

23. The method of claim 18, wherein the securing step further comprises lowering the pallet while grasping the isolated live objects at a constant height such that the legs of the isolated live objects are inserted into the grippers affixed to each of the rotatable shackle.

24. The method of claim 18, further comprising transferring the rotatable shackle having a hanging isolated live object therein to a moving shackle line.

* * * * *

UNITED STATES PATENT AND TRADEMARK OFFICE
CERTIFICATE OF CORRECTION

PATENT NO.       : 6,623,346 B2                                         Page 1 of 1
APPLICATION NO.  : 09/748656
DATED            : September 23, 2003
INVENTOR(S)      : Lee It is certified that error appears in the above-identified patent and that said Letters Patent is hereby corrected as shown below:

Sheet 13, Fig. 9,
   the block labeled "Beam Switch 132" should read --Beam Switch 133--;
   the block labeled "Imaging Sensor 132" should read --Imaging Sensor 135--.

Column 4,
   line 48, "attachment G" should be changed to --appendix G--;
   line 52, "Attachment G" should be changed to --Appendix G--;
   lines 64-65, "FIG. 4" should be changed to --FIG. 7A--.

Column 5,
   line 14, "attachment G" should be changed to --appendix G--.

Column 9,
   line 10, "imaging sensor to capture" should read --imaging sensor 135 to capture--;
   lines 26 and 31, "Attachments A-J" should be changed to --Appendices A-J--.

Signed and Sealed this

Twenty-second Day of August, 2006

JON W. DUDAS
*Director of the United States Patent and Trademark Office*